United States Patent [19]

Iwata et al.

[11] 4,074,287
[45] Feb. 14, 1978

[54] FLASH AND CAMERA DEVICE

[75] Inventors: Hiroshi Iwata; Tetsuo Yamaoka, both of Osaka, Japan

[73] Assignee: West Electric Co., Ltd., Osaka, Japan

[21] Appl. No.: 701,981

[22] Filed: July 1, 1976

[30] Foreign Application Priority Data

July 7, 1975 Japan ................................. 50-83813

[51] Int. Cl.² ........................... G03B 7/08; G03B 7/18
[52] U.S. Cl. ......................................... 354/31; 354/33; 354/59; 354/60 F
[58] Field of Search ....................... 354/31, 32, 33, 34, 354/49, 50, 51, 59, 60 F

[56] References Cited

U.S. PATENT DOCUMENTS

| 3,581,149 | 5/1971 | Fujisawa | 354/59 |
| 3,750,540 | 8/1973 | Yanagisawa et al. | 354/31 |
| 3,805,279 | 4/1974 | Fliesser et al. | 354/31 UX |
| 3,836,922 | 9/1974 | Hasegawa et al. | 354/51 |
| 4,000,497 | 12/1976 | Galbraith | 354/59 X |

*Primary Examiner*—L. T. Hix
*Assistant Examiner*—M. L. Gellner
*Attorney, Agent, or Firm*—Stevens, Davis, Miller & Mosher

[57] ABSTRACT

A flash and camera device integrally incorporating an automatic exposure camera which automatically adjusts the exposure depending on the brightness of an object and an electronic flash device which is capable of controlling the light intensity of a flash discharge tube which fires by consuming the charged energy of a main discharging capacitor. The amount of incident light to a first light sensor for controlling the exposure of the automatic exposure camera and the amount of light reflected from the object, which impinges on a second light sensor for controlling the light intensity of the electronic flash device, are changed in linked manner for simultaneously adjusting the exposure and the light intensity in accordance with the brightness of the object and the sensitivity of a film.

11 Claims, 10 Drawing Figures

FLASH AND CAMERA DEVICE

The present invention relates to a flash and camera device having automatic exposure control means which integrally incorporates an electronic shutter capable of automatically controlling the shutter open time period and an electronic flash device with a light intensity control ability.

In general, an automatic exposure camera which is capable of automatically controlling the exposure depending on the brightness of an object tracks changes in the brightness of the object to continuously provide a proper exposure. However it requires adjustment of the exposure level whenever a film having a different sensitivity is to be used, in order to assure the proper exposure.

In such an automatic exposure camera, when the brightness of the object is low (that is, the object is dark) or when the object is illuminated by back-light, an electronic flash device having a flash discharge tube which fires by consuming the charged energy of a main capacitor is fired as is well known in the art. In this case, however, since the guide number of the electronic flash device also changes depending on the sensitivity of the film used, the user must always pay attention to the film sensitivity. When an electronic flash device which has been recently used widely and which incorporates an automatic light control circuit for controlling the light intensity of a flash discharging tube depending on the reflected light from the object (hereinafter referred to as an auto-strobotron device) is used, it is also required to re-establish the light control level of the auto-strobotron device whenever a film of different sensitivity is used. Therefore, handling is troublesome because reestablishment of the exposure level of the automatic exposure camera as well as reestablishment of the light control level of the auto-strobotron device are required.

It is, therefore, an object of the present invention to provide a flash and camera device which integrally incorporates an automatic exposure camera and an autostrobotron device and which is capable of establishing the exposure level of the automatic exposure camera and the establishment of the light control level of the autostrobotron device with a simple structure.

It is another object of the present invention to provide a flash and camera device which permits automatic setting of those levels.

The above and other objects, features and advantages of the present invention will become more apparent from the following description of the preferred embodiments of the invention when taken in conjunction with the accompanying drawings, in which.

Figure 1:
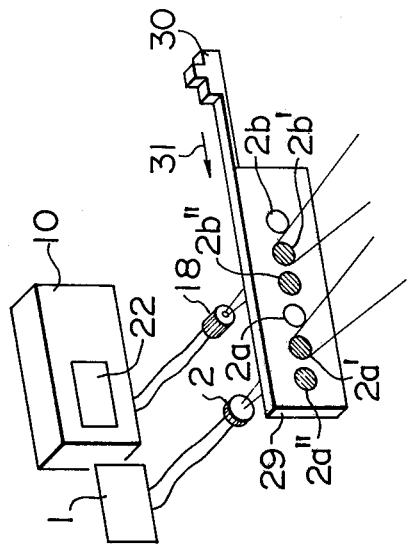
FIG. 1 shows an electric circuit diagram of one embodiment of the flash and camera device of the present invention.

FIG. 1 shows an electric circuit diagram of one embodiment of the flash and camera device of the present invention. It includes an exposure control circuit 1 for measuring the brightness of an object to determine the exposure, which comprises a first light sensor 2 such as a CdS cell, photo-transistor or the like, an integrating capacitor 3 for storing a photoelectric current converted by the light sensor 2, a switch 4, a switching circuit 7, and an electromagnet 8. In operation, when the switch 4 is opened by the opening of shutter plates or vanes (not shown) which also serve as iris vanes, the integrating capacitor 3 starts to be charged by a photoelectric current from the light sensor 2 which senses the brightness of the object. When the charge on integrating capacitor 3 reaches a predetermined level, a transistor 5 is turned on and a transistor 6 which has been conductive is turned off so that the electromagnet 8 which has been fed by a power supply 9 is deenergized and the shutter vanes are closed.

10 designates an example of a well-known autostrobotron device, which comprises a converter including an oscillation transformer 11 and an oscillation transistor 12, a main discharging capacitor 14, a flash discharge tube 15, a trigger circuit 16 and a light intensity control circuit 17.

In operation, upon the depression of a shutter button (not shown), the trigger circuit 16 is activated to apply a trigger pulse to the flash discharge tube 15 for firing the same. The flash light illuminates the object and the reflected light therefrom is received by a light sensor circuit 22 including a second light sensor 18 such as a photo-transistor, CdS cell or the like and an integrating capacitor 21. When the integrated charge on the integrating capacitor 21 reaches a predetermined level, a trigger circuit 27 including an SCR 23, a trigger capacitor 24 and a trigger coil 26 is actuated.

By a trigger pulse from the trigger circuit 27, a bypass discharge tube 28 which has a lower impedance than the flash discharge tube 15 is fired so that the charged energy of the main discharge capacitor 14 is bypassed to stop the light emission from the flash discharge tube 15.

Figure 2:
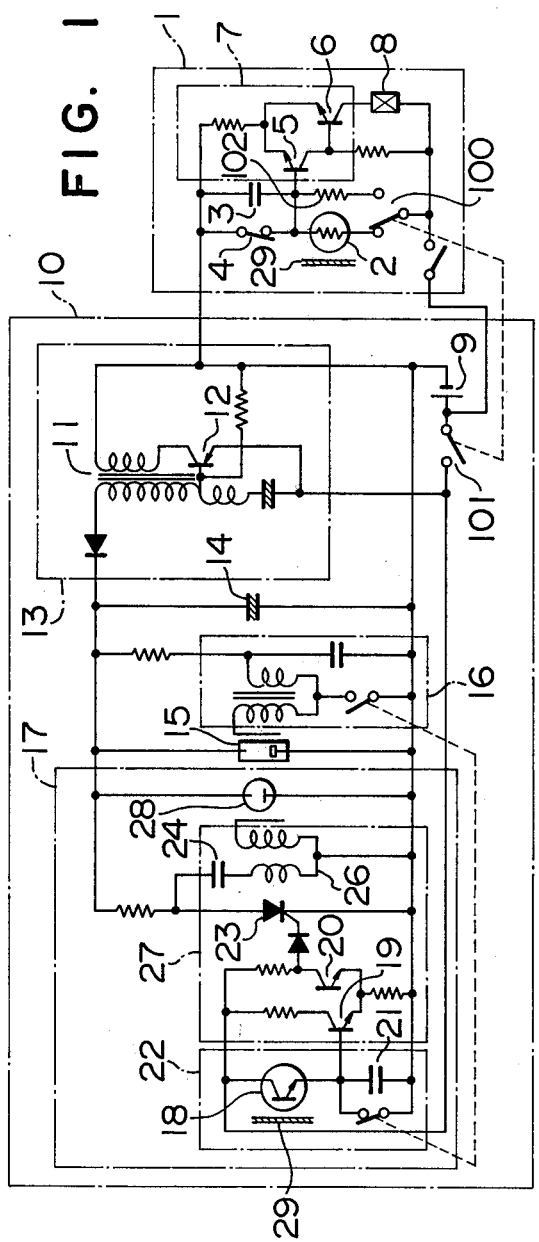
FIG. 2 shows the construction of a film sensitivity selection mechanism for causing the flash and camera device of the present invention to operate properly depending on film sensitivity.
Figure 3:
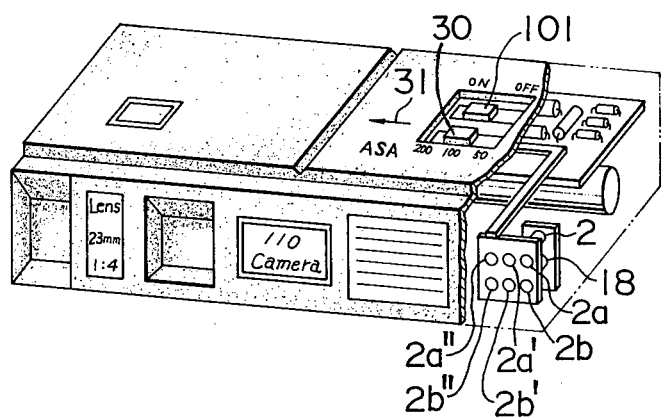
FIG. 3 shows an external view of the structure of the flash and camera device of the present invention.

Having described the basic operation of the autostrobotron device 10 and the exposure control circuit 1, the operation where a film of a different film sensitivity is used or where it is desired to change the exposure to any value is now explained in conjunction with FIGS. 2 and 3.

FIG. 2 shows the construction of sensitivity selection means which allows the selection of any one of a plurality of film sensitivities and exposures. In FIG. 2, 19 designates a filter mount to be arranged in front of the first light sensor 2 and the second light sensor 18. Arranged in the filter mount 29 are a first group of three filters 2a, 2a' and 2a" having different light transmitting densities at the location facing the front of the first light sensor 2, and a second group of three filters 2b, 2b' and 2b" having different light transmitting densities at the location facing the second light sensor 18.

The transmissions of the first and second filters have the relations of $2a > 2a' > 2a''$ and $2b > 2b' > 2b''$, respectively. The filter mount 29 is formed with a selection knob 30 which enables the selection of filters according to the sensitivity of the film and desired exposure.

The relative relationship between the first light sensor 2 and the second light sensor 18, and the respective filters is such that when the filter 2a is positioned in front of the light sensor 2 the filter 2b is located in front of the light sensor 18, and when the filter 2a' is positioned in front of the light sensor 2 the filter 2b' is located in front of the light sensor 18, and when the filter 2a" is positioned in front of the light sensor 2 the filter 2b" is positioned in front of the light sensor 18.

The operation of a device incorporating the above sensitivity selection means is described below.

When a film having the sensitivity of ASA 100 (DIN 21), for example, is used, the selection knob 30 is operated to position the filter 2a' in front of the first light sensor 2 and the filter 2b' in front of the second light sensor 18 so that incident light to the light sensors 2 and 18 are adjusted in accordance with the film sensitivity. When the brightness of the object is high enough for the flash of the auto-strobotron device 10 to be unnecessary, that is, when the power switch 101 is off and natural light photography is to occur, the incident light to the first light sensor 2 passes through the filter 2a'. Since the light passing through the filter 2a' is less intense than the light through the filter 2a, the photoelectric current of the light sensor 2 reduces. Thus, the switching circuit 7 including the integrating capacitor 3 and the transistors 5 and 6 is actuated so that the time required to cut off current through the electromagnet 8 increases as compared with the case where the filter 2a is used.

Also, when the ASA 100 (DIN 21) film is used and the power switch 101 of the autostrobotron device is turned on to fire the same for effecting flash mode photography, the filter 2b' is positioned in front of the second light sensor 18. In this case the light intensity to the light sensor 18 is less than that when light passes through the filter 2b. Accordingly, the time from the initiation of the reception of reflected light from the object by the light receiving circuit 22 to the operation of the trigger circuit 27 to cause the bypass discharge tube 28 to discharge increases as compared with the case where the filter 2b is used, and hence the light intensity increases accordingly.

During flash mode photography, switch 100 of the exposure control circuit 1 is thrown to the fixed resistor 102 in linked relation with the turn-on of power switch 101 so that the operation of the switching circuit 7 is fixed and hence the open period of the shutter vanes is fixed. The density of the filter 2a' is determined taking the time which matches with the exposure in natural light photography using a low sensitivity film into consideration, and the density of the filter 2b' is determined taking the intensity of flash light which matches with the film sensitivity into consideration.

Accordingly, when a film of lower sensitivity is used, the shutter speed is decreased for natural light photography and the firing period is extended for flash mode photography, as compared with the case where a film of higher sensitivity is used, so that an exposure which matches with the film sensitivity is obtained.

When a film of a high sensitivity, e.g. ASA 200 (DIN 24) is used, the filter mount 29 is moved by the selection knob 30 in the direction of an arrow 31 so that the low density filter 2a is positioned in front of the first light sensor 2 and the low density filter 2b is positioned in front of the second light sensor 18. As a result, the light intensity to the first light sensor 2 for natural light photography and the light intensity to the second light sensor 18 for flash mode photography increases respectively and the shutter speed is increased accordingly. At the same time, the light intensity of the auto-strobotron device decreases. In this manner, the exposure which matches with the film sensitivity is obtained. Namely, when the film sensitivity is high, the shutter speed is changed for natural light photography and the firing period is changed for flash mode photography such that the shutter speed is increased or the firing period decreased as compared with the case where a film of lower sensitivity is used. In this manner, the exposure which matches with the film sensitivity is obtained by a simple selection operation.

When a film of low sensitivity, e.g. ASA 50 (DIN 18) is used, the selection knob 30 is operated to position the filters 2a" and 2b" in front of the first and second light sensors 2 and 18, respectively. Thus, a proper exposure in both natural light photography and flash mode photography is assured.

While the films of higher and lower sensitivities relative to ASA 100 (DIN 21) film have been taken as the examples, the filters need not necessarily be selected in accordance with the film sensitivity. For example, when an over-exposure or under-exposure by 1 EV with respect to a proper exposure is desired for the ASA 100 (DIN 21) film, the selection knob 30 may be used for this purpose.

Photography in which the uniformity of the brightness of the object is extremely low, such as in back-light photography, is now explained.

When a low sensitivity film such as ASA 100 (DIN 21) film is used with the automatic exposure camera under the natural light photography mode to photograph an object which is under back-light conditions, the incident light to the first light sensor 2 accepts a large amount of light not reflected from the object and a small amount of light reflected from the object itself. Therefore, the exposure is determined not for the object but from the background-object resulting in underexposure for the desired object. In this case, therefore, the selection knob 30 is operated to position the filter 2a" in front of the first light sensor 2. As a result, the incident light to the first light sensor 2 through the filter 2a" reduces as compared with the incident light that would be applied to the first light sensor 2 when the filter 2a' which corresponds to the sensitivity of the film presently loaded in the camera would be used, and hence the photoelectric current of the light sensor 2 reduces accordingly.

Consequently, the time required for the switching circuit 7 including the integrating capacitor 3 and the transistors 5 and 6 to reach an operation threshold is lengthened, and hence the open period of the shutter vanes (not shown) is lengthened so that under-exposure of the object is avoided and substantially proper exposure is attained even under back-light conditions.

Figure 4:
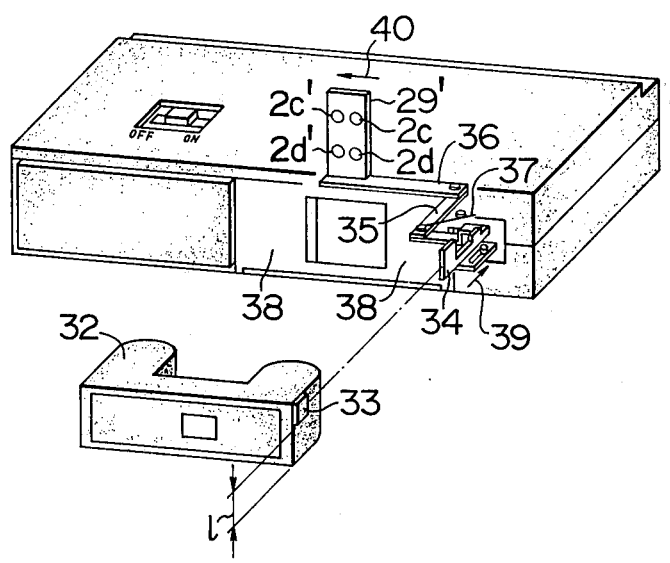
FIG. 4 shows an external view of the structure of the flash and camera device of the present invention with another film sensitivity selection mechanism.

FIG. 4 shows an external view of the construction of another embodiment of the flash and camera device of the present invention which includes means for automatically setting the selection knob depending on the sensitivity of the film used.

In the embodiment of FIG. 4, the sensitivity selection is effected not manually but automatically upon loading of the film. This embodiment presents the use of a cartridge type film with the flash and camera device and requires no manual operation when a different film sensitivity is used so that a mistake in photography due to erroneous operation is completely avoided.

In FIG. 4, 32 designates a film cartridge such as Kodak 110 or 120 (trade name), which is formed with a projection 33 having a length which changes with the film sensitivity. For example, for the ASA 100 (DIN 21) film, the length *l* from the bottom of the film cartridge 32 to the projection 33 is set to be shorter than the length for the ASA 200 (DIN 24) film cartridge.

Further, the film sensitivity selection mechanism is provided with a film sensitivity sensing lever 34, an L-shaped transmission member 35, a straight transmission member 36 and a return spring 37. When the film cartridge 32 is not loaded, the film sensitivity sensing lever 34 is projected in the forward direction by the action of the return spring 37. This operation is explained below. As stated above, for the ASA 100 (DIN 21) film, when the film cartridge 32 is loaded in a cartridge housing 38, the projection 33 of the cartridge depresses the film sensitivity sensing lever 34 to move the same in the direction of an arrow 39 and the L-shaped transmission member 35 is pivoted counter-clockwise to move the transmission member 36 to the left causing the filter selection plate 29' to move in the direction of an arrow 40.

As a result, the high density filter 2c is positioned in front of the first light sensor 2 and the high density filter 2d is positioned in front of the second light sensor 18 to allow the reception of light intensity adapted to the ASA 100 (DIN 21) sensitivity so that the exposure for natural light photography and the flash light intensity for flash mode photography are adjusted to proper values. When the film cartridge 32 is unloaded after completion of the photography, the film sensitivity sensing lever 34 is reset by the action of the return spring 37.

For a higher sensitivity film cartridge such as the ASA 200 (DIN 24) film cartridge, when the film cartridge 32 is loaded in the housing 38 the film sensitivity sensing lever 34 is not moved because the length *l* of the cartridge 32 in this case is longer than that of the ASA 100 (DIN 21) film cartridge and hence the film sensitivity sensing lever 34 does not engage the projection 33. Therefore, the filter selection plate 29' is positioned at the normal position so that the low density filter 2c' is positioned in front of the first light sensor 2 and the low density filter 2d' is positioned in front of the second light sensor 18. In this manner, the exposure for natural light photography and flash light intensity for the flash mode photography are adjusted to proper values adapted to the ASA 200 (DIN 24) sensitivity.

In the above description, the physical position of the projection formed on the film cartridge depending on the film sensitivity is sensed by the film sensitivity sensing lever 34. When a mark indicative of the film sensitivity is formed on the film cartridge by magnetic or optical means, a similar effect to that described above is attained by detecting that mark by magnetic or optical transducer means.

As the exposure control means, that is, the incident light control means to the light sensor, in addition to the filters in the above embodiment, iris diaphargms arranged in front of the light sensor, or a liquid crystal plate arranged in front of the light sensor may be used, or the operation threshold of the switching circuit 7 of FIG. 1 or the trigger circuit 27 may be controlled to correspond to the film sensitivity.

Figure 5:
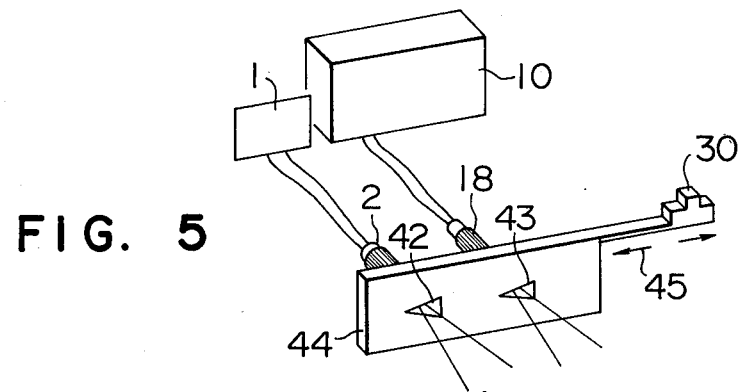
FIG. 5 shows the construction of another embodiment of the film sensitivity selection mechanism to be used with the flash and camera device of the present invention.
Figure 6:
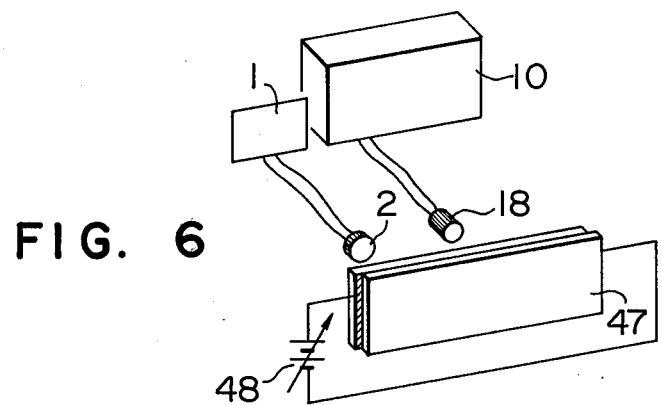
FIG. 6 shows the construction of a further embodiment of the film sensitivity selection mechanism to be used with the flash and camera device of the present invention.

FIG. 5 shows the construction of another embodiment of the film sensitivity selection means to be incorporated in the flash and camera device of the present invention. In the drawing, an aperture selection plate 44 having apertures 42 and 43 formed therein as shown, which is actuated in response to the film sensitivity, is arranged in front of the first light sensor 2 and the second light sensor 18. When a film of low sensitivity is used, the aperture selection plate 44 is moved to the illustrated position by the operation of the knob 30, and when a film of high sensitivity is used the aperture selection plate 44 is moved in the direction of an arrow 45 to cause the apertures 42 and 43 to present larger openings to the light sensors 2 and 18, which thus receive more incident light. On the other hand, when the film sensitivity is low, the light sensors 2 and 18 receive less incident light. In this manner, without using the filters, proper exposure for the particular film sensitivity is attained to the same extent as in the case where the filters are used. Furthermore, since the openings can be changed continuously, the selection of the film sensitivity is facilitated with a simple structure over a wide range of film sensitivity.

Furthermore, it is possible to provide an electrooptical effect by use of a liquid crystal plate, for example, which effect changes in accordance with the film sensitivities, to control the incident light to the light sensors 2 and 18.

Where a nematic type liquid crystal plate 47 is arranged in front of the first light sensor 2 and the second light sensor 18 and as a voltage 48 applied thereto is increased, transmission through the liquid crystal plate decreases to reduce the amount of incident light to the respective light sensors 2 and 18. On the other hand, as the applied voltage 48 decreases, transmission through the liquid crystal plate 47 increases to increase the amount of incident light to the light sensors 2 and 18. By changing the transmission of the liquid crystal plate 47 in association with the film sensitivity, it is possible to attain the same effect as is obtainable by the filters described in the previous embodiment. Therefore, by appropriately changing the applied voltage 48 to the liquid crystal plate 47, the film sensitivity selection can be effected by a simple operation for natural light photography or flash mode photography to attain a proper exposure for the particular film sensitivity.

Figure 7:
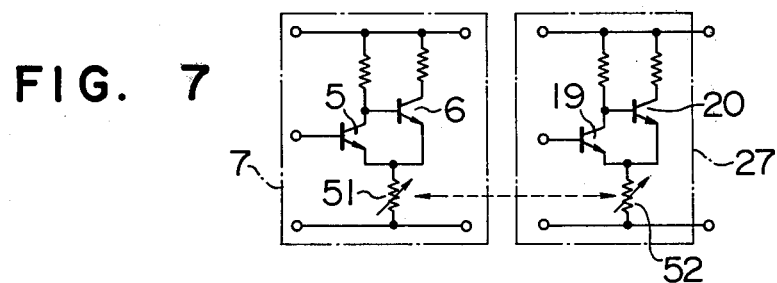
FIG. 7 shows an electric circuit diagram of a still further embodiment of electric film sensitivity selection means to be used with the flash and camera device of the present invention.
Figure 8:
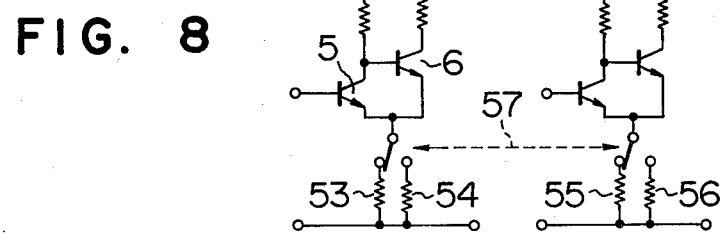
FIG. 8 shows an electric circuit diagram of still another embodiment of the electric film sensitivity selection means to be used with the flash and camera device of the present invention.

While the constructions for controlling the amount of light to the light sensors 2 and 18 have been described above, the selection may be effected purely electrically as shown in FIGS. 7 and 8. The construction and the operations thereof are described below.

As shown in FIG. 7, potentiometers 51 and 52 for changing the operation thresholds are provided in the switching circuit 7 for controlling the exposure for natural light photography, which comprises the transistors 5 and 6 and transistors 19 and 20, and in the trigger circuit 27 for controlling the light intensity for the flash mode photography, respectively. Thus, the switching circuit 7 and the trigger circuit 27 have their operation thresholds changed in accordance with the resistances of the potentiometers 51 and 52. In this manner, the same effect as is obtainable by controlling the amount of light to the light sensors 2 and 18 is attained.

Figure 9:
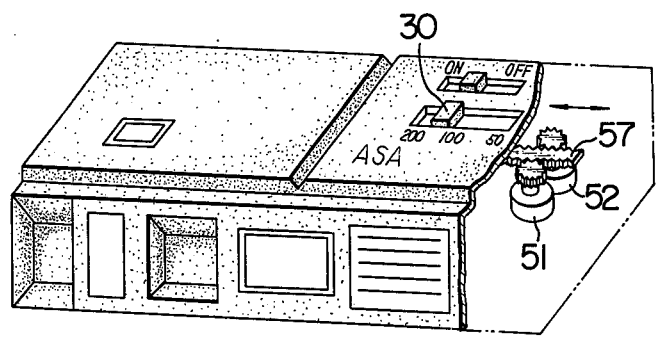
FIG. 9 illustrates mechanical means for actuating components of the electrical circuit of FIG. 7.
Figure 10:
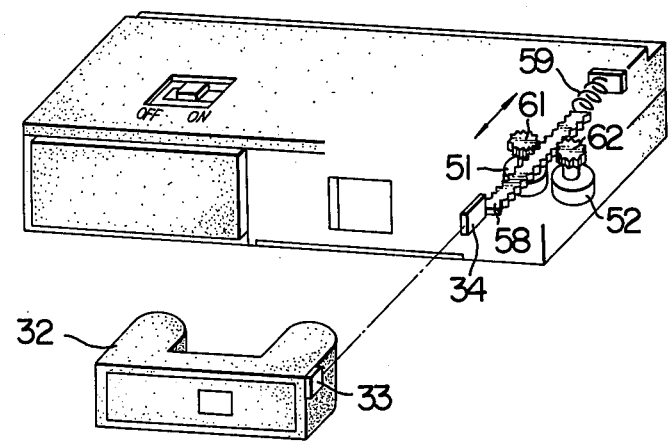
FIG. 10 illustrates alternative mechanical means for actuating components of the electrical circuit of FIG. 7.

The potentiometers 51 and 52 may be adjusted by a member 57 which is moved with a knob 30 in the direction shown by the arrow in FIG. 9. When the adjustment is to be made without the knob 30, the potentiometers 51 and 52 may be adjusted by members 61 and 62 which move with a transmission member 58, which in turn moves with the sense lever 34 as shown in FIG. 10. When the film cartridge 32 is removed the sense lever 34 is reset by a reset spring 59. Furthermore, the potentiometers 51 and 52 in FIG. 7 may be replaced by a pair of fixed resistors 53 and 54 and a pair of fixed resistors 55 and 56, respectively, as shown in FIG. 8, with a ganged switch 57 being connected to select the resistors, thereby attaining the same effect as is obtainable with the potentiometers.

What is claimed is:

1. A flash and camera device comprising:
  an automatic exposure camera including a first light sensor for sensing the brightness of an object and means for controlling the exposure of said camera in accordance with the output of said first light sensor;
  an electronic flash device including firing means for emitting a predetermined amount of light toward said object, a second light sensor for sensing light reflected by said object as a result of light transmitted thereto by said electronic flash device, and a firing control circuit for causing the generation of light by said firing means to stop in the course of firing in response to the output from said second light sensor;
  incident light amount control means for changing the amounts of incident light transmitted to said first and second light sensors in linked manner; and
  selection means for switching said incident light amount control means in association with the exposure of said automatic exposure camera and the amount of light emitted by said electronic flash device.

2. A flash and camera device according to claim 1 wherein said incident light amount control means includes a plurality of neutral density filters having different transmissions.

3. A flash and camera device according to claim 1 wherein said incident light amount control means includes a plurality of wedge-shaped apertures for permitting the change of openings thereof.

4. A flash and camera device according to claim 1 wherein said incident light amount control means includes a liquid crystal plate, the transmission of which is variable as a function of the voltage applied thereto.

5. A flash and camera device according to claim 1 wherein said selection means includes a mechanism provided outside the body of said flash and camera device and linked to a selection member for making the selection.

6. A flash and camera device according to claim 1 wherein said selection means includes a film sensitivity sensing lever for sensing a sense member provided on a film cartridge in accordance with a particular film sensitivity thereof, a transmission mechanism for transmitting the movement of said film sensitivity sensing lever and a mechanism responsive to said transmission mechanism for operating said incident light amount control means.

7. A flash and camera device comprising:
  an automatic exposure camera including a first light sensor for sensing the brightness of an object, a first control circuit operated in response to the output of said first light sensor, and means for controlling the exposure of said camera by said first control circuit;
  an electronic flash device including firing means for emitting a predetermined amount of light toward said object, a second light sensor for sensing light reflected by said object as a result of light transmitted thereto by said electronic flash device, a second control circuit operated in response to the output of said second light sensor and stop means responsive to said second control circuit for causing the generation of light by said firing means to stop in the course of said generation;
  operation threshold adjusting means for changing the operation thresholds of said first and second control circuit in a linked manner; and
  selection means for switching said operation threshold adjusting means in association with the exposure of said automatic exposure camera or the amount of the light emitted by said electronic flash device.

8. A flash and camera device according to claim 7 wherein said operation threshold adjusting means includes linked potentiometer means.

9. A flash and camera device according to claim 7 wherein said operation threshold adjusting means includes linked fixed resistor switching means.

10. A flash and camera device according to claim 7 wherein said operation threshold adjusting means includes a mechanism linked to a selection member operable from outside the body of the flash and camera device.

11. A flash and camera device according to claim 7 wherein said selection means includes a film sensitivity sensing lever for reading an index formed on a film cartridge indicative of film sensitivity, a transmission mechanism for transmitting the movement of said film sensitivity sensing lever and a mechanism for operating said operation threshold adjusting means in response to said transmission mechanism.

* * * * *